United States Patent
Duvalsaint et al.

(10) Patent No.: US 9,122,617 B2
(45) Date of Patent: Sep. 1, 2015

(54) PSEUDO CACHE MEMORY IN A MULTI-CORE PROCESSOR (MCP)

(75) Inventors: Karl J. Duvalsaint, Lagrangeville, NY (US); Daeik Kim, White Plains, NY (US); Moon J. Kim, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 893 days.

(21) Appl. No.: 12/276,069

(22) Filed: Nov. 21, 2008

(65) Prior Publication Data

US 2010/0131712 A1      May 27, 2010

(51) Int. Cl.
 *G06F 12/08*      (2006.01)

(52) U.S. Cl.
 CPC ........ *G06F 12/0897* (2013.01); *G06F 12/0828* (2013.01); *G06F 12/0833* (2013.01); *G06F 2212/621* (2013.01)

(58) Field of Classification Search
 CPC ............ G06F 12/0897; G06F 12/0828; G06F 12/0833; G06F 2212/621
 USPC ................... 711/130, 117, 118, 148; 709/213
 See application file for complete search history.

(56) References Cited

U.S. PATENT DOCUMENTS

| | | |
|---|---|---|
| 5,721,883 A | 2/1998 | Katsuo et al. |
| 5,821,769 A | 10/1998 | Douseki |
| 5,838,047 A | 11/1998 | Yamauchi et al. |
| 6,000,007 A | 12/1999 | Leung et al. |
| 6,038,644 A * | 3/2000 | Irie et al. ........................ 711/141 |
| 6,138,208 A * | 10/2000 | Dhong et al. .................. 711/122 |
| 6,215,898 B1 | 4/2001 | Woodfill et al. |
| 6,289,438 B1 * | 9/2001 | Takayanagi .................... 712/218 |
| 6,404,239 B1 | 6/2002 | Kawahara et al. |
| 6,404,902 B1 | 6/2002 | Takano et al. |

(Continued)

FOREIGN PATENT DOCUMENTS

| | | |
|---|---|---|
| CN | 1427340 A | 7/2003 |
| CN | 1474969 A | 2/2004 |

(Continued)

OTHER PUBLICATIONS

Ulrich Drepper, Memory part 2: CPU cacche, 2007, http://lwn.net/Articles/252125/.*

(Continued)

*Primary Examiner* — Cheng-Yuan Tseng
*Assistant Examiner* — Ramon A Mercado
(74) *Attorney, Agent, or Firm* — William E. Schiesser; Keohane & D'Alessandro PLLC; Hunter E. Webb

(57) ABSTRACT

Specifically, under the present invention, a cache memory unit can be designated as a pseudo cache memory unit for another cache memory unit within a common hierarchal level. For example, in case of cache miss at cache memory unit "X" on cache level L2 of a hierarchy, a request is sent to a cache memory unit on cache level L3 (external), as well as one or more other cache memory units on cache level L2. The L2 level cache memory units return search results as a hit or a miss. They typically do not search L3 nor write back with the L3 result even (e.g., if it the result is a miss). To this extent, only the immediate origin of the request is written back with L3 results, if all L2s miss. As such, the other L2 level cache memory units serve the original L2 cache memory unit as pseudo caches.

18 Claims, 3 Drawing Sheets

(56) References Cited

U.S. PATENT DOCUMENTS

| | | | |
|---|---|---|---|
| 6,456,737 | B1 | 9/2002 | Woodfill et al. |
| 6,535,433 | B2 | 3/2003 | Ooishi |
| 6,567,622 | B2 | 5/2003 | Phillips |
| 6,651,145 | B1 | 11/2003 | Jamil et al. |
| 6,661,931 | B1 | 12/2003 | Kawada |
| 6,744,931 | B2 | 6/2004 | Komiya et al. |
| 6,829,378 | B2 | 12/2004 | DiFilippo et al. |
| 6,922,783 | B2 | 7/2005 | Knee et al. |
| 7,028,196 | B2 | 4/2006 | Soltis, Jr. et al. |
| 7,039,818 | B2 | 5/2006 | Deng et al. |
| 7,080,267 | B2 | 7/2006 | Gary et al. |
| 7,095,882 | B2 | 8/2006 | Akahori |
| 7,102,777 | B2 | 9/2006 | Haraguchi |
| 7,142,725 | B2 | 11/2006 | Komiya et al. |
| 7,168,070 | B2 | 1/2007 | Archambault et al. |
| 7,240,160 | B1 | 7/2007 | Hetherington et al. |
| 7,260,677 | B1 * | 8/2007 | Vartti et al. ............ 711/112 |
| 7,418,368 | B2 | 8/2008 | Kim et al. |
| 7,436,205 | B2 | 10/2008 | Tada |
| 7,521,762 | B2 | 4/2009 | Nidaka |
| 7,531,944 | B2 | 5/2009 | Itoh |
| 7,685,354 | B1 | 3/2010 | Hetherington et al. |
| 2002/0129208 | A1 * | 9/2002 | Barroso et al. ............ 711/141 |
| 2003/0080782 | A1 | 5/2003 | Bailey et al. |
| 2003/0114205 | A1 | 6/2003 | Yamashita |
| 2004/0059875 | A1 * | 3/2004 | Garg et al. ............ 711/141 |
| 2005/0034002 | A1 | 2/2005 | Flautner |
| 2005/0083338 | A1 | 4/2005 | Yun et al. |
| 2005/0144223 | A1 | 6/2005 | Yang et al. |
| 2005/0263678 | A1 | 12/2005 | Arakawa |
| 2005/0268039 | A1 | 12/2005 | Archambault et al. |
| 2005/0289365 | A1 | 12/2005 | Bhandarkar |
| 2006/0013473 | A1 | 1/2006 | Woodfill et al. |
| 2006/0015772 | A1 * | 1/2006 | Ang et al. ............ 714/7 |
| 2006/0022742 | A1 | 2/2006 | Parris et al. |
| 2006/0250514 | A1 | 11/2006 | Inoue et al. |
| 2006/0268357 | A1 | 11/2006 | Vook et al. |
| 2007/0159642 | A1 | 7/2007 | Choi |
| 2008/0015772 | A1 | 1/2008 | Sanme et al. |
| 2008/0084775 | A1 | 4/2008 | Hoberman et al. |
| 2008/0122479 | A1 | 5/2008 | Hidaka |

FOREIGN PATENT DOCUMENTS

| | | | |
|---|---|---|---|
| CN | 1871587 | A | 11/2006 |
| EP | 1662389 | A2 | 5/2006 |
| EP | 1863177 | A2 | 12/2007 |
| WO | 95/25306 | A2 | 9/1995 |

OTHER PUBLICATIONS

Levacq, D. et al., Backgate Bias Accelerator for 10ns-order Sleep-to-Active Modes Transition time, IEEE Asian Solid-State Circuits Conference, Nov. 2007, pp. 296-299.

Kim, K. et al., "Back-Gate Controlled Wide Tunable Range Diode Voltage in Asymmetrical Double-Gate Devices", IEEE International SOI Conference Proceedings, Oct. 2006, pp. 151-152.

Makino, H. et al., "An Auto-Backgate-Controlled MT-CMOS Circuit", 1998 Symposium on VLSI Circuits Digest of Technical Papers, Jun. 1998, pp. 42-43.

Notice of Allowance dated May 21, 2010 for U.S. Appl. No. 12/275,521, filed Nov. 21, 2008.

Prosecution History for U.S. Appl. No. 12/275,508.
Prosecution History for U.S. Appl. No. 12/275,552.
Prosecution History for U.S. Appl. No. 12/276,072.
Prosecution History for U.S. Appl. No. 12/275,521.
Information Materials for IDS dated Jun. 22, 2011.
Information Materials for IDS.
Bibliographic Data for CN1474969(A) with English Abstract.
Bibliographic Data for CN1871587(A) with English Abstract.
Bibliographic Data for CN1427340(A) with English Abstract.
U.S. Appl. No. 12/276,072, Office Action, Mar. 27, 2014, 44 pages.
Thapar et al., :Scalable Cache Coherence for Shared Memory Multiprocessors, 1991, 12 pages.
U.S. Appl. No. 12/276,072, Office Action, Nov. 21, 2012, 17 pages.
Sohi, "Cache memory organization to enhance the yield of high performance VLSI processors", Computers, IEEE, Transaction on, vol. 38, No. 4, pp. 484-492, Apr. 1989.
U.S. Appl. No. 12/276,072, Office Action, Jun. 19, 2014, 13 pages.
U.S. Appl. No. 12/276,072, Office Action, Jun. 4, 2013, 29 pages.
U.S. Appl. No. 12/275,552, Office Action, Mar. 25, 2014, 44 pages.
U.S. Appl. No. 12/275,552, Office Action, Sep. 10, 2012, 64 pages.
U.S. Appl. No. 12/275,552, Office Action, Jun. 26, 2014, 16 pages.
U.S. Appl. No. 12/275,552, Office Action, May 23, 2013, 16 pages.
U.S. Appl. No. 12/275,508, Office Action, Sep. 7, 2012, 21 pages.
U.S. Appl. No. 12/275,508, Notice of Allowance, Mar. 28, 2014, 41 pages.
U.S. Appl. No. 12/275,508, Office Action, May 23, 2013, 21 pages.

* cited by examiner

PSEUDO CACHE MEMORY IN A MULTI-CORE PROCESSOR (MCP)

CROSS-REFERENCE TO RELATED APPLICATIONS

This application is related in some aspects to commonly owned and co-pending Ser. No. 12,275,521 entitled "Charge Transfer for Digital Circuits," filed Nov. 21, 2008, the entire contents of which are herein incorporated by reference. This application is also related in some aspects to commonly owned and co-pending Ser. No. 12,275,508 entitled "Mounted Cache Memory in a Multi-Core Processor (MCP)," filed Nov. 21, 2008, the entire contents of which are herein incorporated by reference. This application is also related in some aspects to commonly owned and co-pending Ser. No. 12,275,552 entitled "Cache Memory Sharing in a Multi-Core Processor (MCP)," filed Nov. 21, 2008, the entire contents of which are herein incorporated by reference. This application is also related in some aspects to commonly owned and co-pending Ser. No. 12,276,072 entitled "Cache Memory Bypass in a Multi-Core Processor (MCP)," filed Nov. 21, 2008, the entire contents of which are herein incorporated by reference.

FIELD OF THE INVENTION

The preset invention generally relates to multi-core processors (MCP). Specifically, the present invention relates to the designation of pseudo cache memory units a MCP.

BACKGROUND OF THE INVENTION

Multi-Core Processor (MCP) with hierarchical architecture is a trend for state-of-the-art digital system. Typically, MCPs are implemented with aggressively scaled nanometer CMOS technologies to have high device density and multi-core design. On the other hand, yield failure is caused by the process variability and defects in nanometer CMOS manufacturing. With the hierarchical architecture, a partial failure causes extensive damage to the components in the tree hierarchy and architecture. Therefore, system design and operation methods to salvage operational component blocks are essential to improve product yield as well as to increase the reliability.

SUMMARY OF THE INVENTION

This invention describes an apparatus, computer architecture, memory structure, memory control, and cache memory operation method for multi-core processor. Specifically, under the present invention, a cache memory unit can be designated as a pseudo cache memory unit for another cache memory unit within a common hierarchal level. For example, in case of cache miss at cache memory unit "X" on cache level L2 of a hierarchy, a request is sent to a cache memory unit on cache level L3 (external), as well as one or more other cache memory units on cache level L2. The L2 level cache memory units return search results as a hit or a miss. They typically do not search L3 nor write back with the L3 result even (e.g., if it the result is a miss). To this extent, only the immediate origin of the request is written back with L3 results, if all L2s miss. As such, the other L2 level cache memory units serve the original L2 cache memory unit as pseudo caches. This functionality is enabled by cache manager that wraps the L2 cache inputs and outputs. The method improves on-chip cache hit rate, cache memory efficiency, and computation performance.

A first aspect of the present invention provides a pseudo memory system, comprising: a first memory unit mounted on a bus; a first manager coupled to the first memory unit; and a second memory unit mounted on the bus, the second memory unit being on a common hierarchical level with the first memory unit, and the first cache manager being configured to receive a request, send the request to the second memory unit, and to designate the second memory unit as a pseudo memory unit for the first memory unit.

A second aspect of the present invention provides a pseudo memory system, comprising: a pseudo cache memory system, comprising: a first cache memory unit coupled to a bus; a first cache manager coupled to an input and an output of the first cache memory unit; a first set of sub-cache memory units coupled to the first cache manager; a second cache memory unit coupled to the bus, the second cache memory unit being in a common hierarchical level with the first cache memory unit; a second cache manager coupled to an input and an output of the second cache memory unit; and a second set of sub-cache memory units coupled to the second cache manager, the first cache manager being operable to: receive a request, designate the second cache memory unit as a pseudo cache memory unit of the first cache memory unit, and send the request to the pseudo cache memory unit.

A first aspect of the present invention provides a pseudo memory system, comprising: a pseudo cache memory method, comprising: receiving a request on a first cache manager, the first cache manager being coupled to a first cache memory unit, the first cache memory unit being coupled to a bus; designating a second cache memory unit as a pseudo cache memory unit of the first cache memory unit, the second cache memory unit also being coupled to the bus; and sending the request to the pseudo cache memory unit.

BRIEF DESCRIPTION OF THE DRAWINGS

These and other features of this invention will be more readily understood from the following detailed description of the various aspects of the invention taken in conjunction with the accompanying drawings in which.

Figure 1:
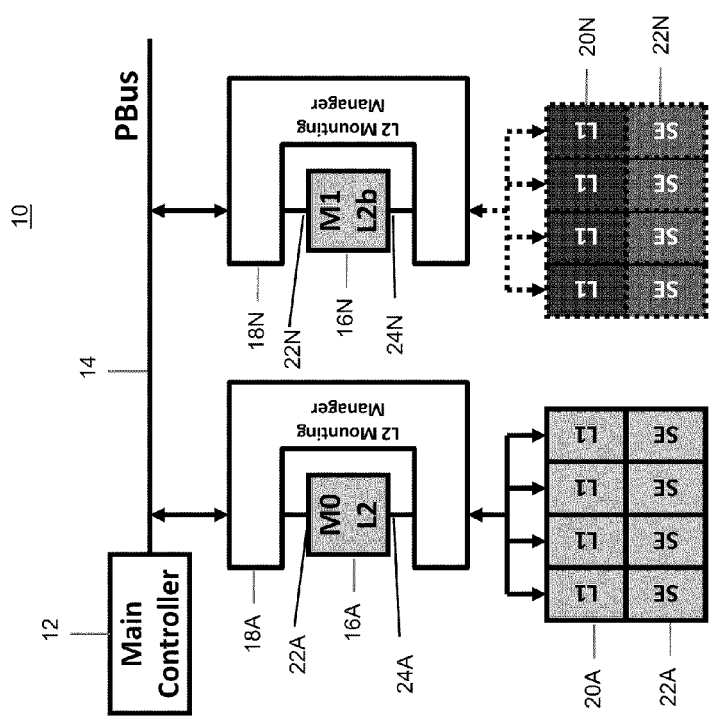
FIG. 1 depicts the comparison of a pseudo cache memory system according to the present invention.

It should be understood that the drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Illustrative Example

I. General Description

As indicated above, this invention describes an apparatus, computer architecture, memory structure, memory control, and cache memory operation method for multi-core processor. Specifically, under the present invention, a cache memory unit can be designated as a pseudo cache memory unit for another cache memory unit within a common hierarchal level. For example, in case of cache miss at cache memory unit "X" on cache level L2 of a hierarchy, a request is sent to a cache memory unit on cache level L3 (external), as well as one or more other cache memory units on cache level L2. The L2 level cache memory units return search results as a hit or a miss. They typically do not search L3 nor write back with the L3 result even (e.g., if it the result is a miss). To this extent, only the immediate origin of the request is written back with L3 results, if all L2s miss. As such, the other L2 level cache memory units serve the original L2 cache memory unit as pseudo caches. This functionality is enabled by cache manager that wraps the L2 cache inputs and outputs. The method improves on-chip cache hit rate, cache memory efficiency, and computation performance.

It should be understood in advance the teachings herein are typically applied to a Multi-Core Processor (MCP), although this need not be the case. In addition, it should be understood although this disclosure discusses memory units as being (virtual) cache or sub-cache memory units, this is only one example of the way in which the teachings recited herein could be implemented. As such, it should be understood that these teachings could be implemented in conjunction with any type of memory now known or later developed.

State-of-the-art digital systems employ a multi-core processor architecture. They are arranged hierarchically for efficient operation and computation management and design scalability. Since they assume that all the components in the hierarchy are sound, one slight failure would cause catastrophic failure of the remaining components in the tree architecture. The present invention addresses the case where a memory block is intact, but the logic components are damaged in the course of manufacturing, aging, and other reasons. In conventional designs, all the components in the hierarchy and tree are abandoned, which it results in very expensive losses in MCP products. The invention proposes to reuse the operational memory block, by mounting the memory to other functional blocks, such as digital logic core or other memory block. Moreover, the reuse of mounted cache memory units improves chip performance and resilience to manufacturing defects. The method can be applied to many different levels of on-chip cache memory.

The cache memory units store data based on an address index and tag. When the logic core requires a certain data set at a memory address, it sends a request to the 1st-level cache memory unit (e.g., L1 cache) to see if it has the content. If the L1 cache memory unit misses, the logic core postpones the execution of the current instruction, to wait for the data. So cache unit misses pose a significant penalty on the microprocessor performance. On the L1 cache memory unit miss, the next level cache (L2) is asked for the content, and so on. The cache response time increases exponentially as it moves along the cache levels. If the request result comes back as a hit, then the cache memory unit will write the new content to itself, and return the data to logic core (in case of L1), or lower level cache memory units (L1 for L2, L2 for L3). Due to the exponentially increasing time penalty with cache misses, cache design (size and algorithm) becomes critical for high-performance MCP design.

With the MCP architecture, there are multiple logic cores, and cache memory units at the same level to support the assigned logic core. As indicated above, a cache memory unit miss causes a next level cache search request to be generated. It used as a strategy when there are small numbers of cores and cache memory units. In a MCP, although though a cache misses a request, there are multiple same level cache memory units that might have the requested contents. Moreover, the same level cache memory units' response time is usually much faster than the next level cache. For example, if a L2 cache memory unit misses a request, the other L2 cache memory units in the chip can respond much faster than an L3 cache memory unit outside the chip. Considering external L3 cache memory unit contents are based L2s in the chip, there is a good probability that other L2s might have the requested content if L3 has the content.

Thus, the invention proposes a pseudo cache in MCP. Under this approach, cache memory units sharing a common hierarchical level with another cache memory unit are eligible to become pseudo cache memory units of the request originating cache memory unit. Pseudo cache memory units (L2s, e.g.) respond much faster than a cache memory unit outside of the hierarchical level (e.g., L3) for either a hit or miss. In case of a hit, the originating cache memory unit writes back the hit result, ignoring the L3 return. If all pseudo caches memory units miss, then the originating cache memory unit just waits for the L3 cache memory results. All other pseudo cache memory units participate in the search and hit/miss, but they do not write back in the case of a miss (which is part of what makes them pseudo cache memory units). The pseudo cache memory units improves cache hit rate in MCP, and therefore computation performance is improved as much.

Referring now to FIG. 1, a pseudo cache memory system 10 according to the present invention is shown. As depicted, system 10 includes a main controller 12, a bus 14, a set (at least one) of cache memory units 16A-N coupled to bus 14, a set (at least one) of sub-cache memory units 20A-N coupled to set of cache memory units 16A-N, and a set (at least one) of sub-processing elements 22A-N coupled to sub-cache memory units 20A-N. Also shown in FIG. 1 is a set of cache managers 18A-N. As depicted, each cache manager 18A-N is coupled to an input 24A-N and an output 26A-N of a cache memory unit 16A-N.

Cache managers 18A-N foster communication among the components of FIG. 1. By using cache managers both cache memory units 16A-N can be isolated from logic cores. In the of cache memory unit 16A, failing memory is isolated. In cache memory unit 16N, memory can be shared among different logic cores with the cache manager. One type of such communication is memory requests. This can be especially useful when one memory unit "misses" or fails to satisfy the request, another memory unit (vertically within the hierarchy or adjacent) can be so requested. The cache memory mounting operation is done by finding dead logic and live memory in the MCP. Any live memory block with dead logic core can be dedicated to another memory or logic core, as a cache or a memory buffer. It does not have to be one-to-one relationship. A main controller at the top hierarchy manages mounting process, by performing diagnosis on memories and cores. Cache manager receives (1) normal cache, (2) mounting or (3) being mounted instructions from the main controller. Main controller 12 communicates with cache managers 18A-N through bus 14.

Thus, a cache manager acts as a wrapper around the cache memory unit and enables the proposed cache operation. Specifically, the cache managers configure the relationship with other cache memory units at the same level in the hierarchy. It should be understood, however, that not all same-level caches have to be pseudo cache of the origin cache. In the event of a miss at a cache level (e.g., L2), the cache manager sends out a L3 search request. The same request is also duplicated to pseudo cache memory units that reside on the same hierarchal level as the cache memory unit that originally received the request. The cache manager at the pseudo cache memory unit differentiates pseudo cache operation from normal cache operation. As such, the search, hit, and miss are same, but the results are returned to the origin cache. Also even if the search is a miss, pseudo operation does not search further to L3. That is, only the originating L2 cache memory unit maintains L3 communication for original cache request.

II. Illustrative Example

Figure 2:
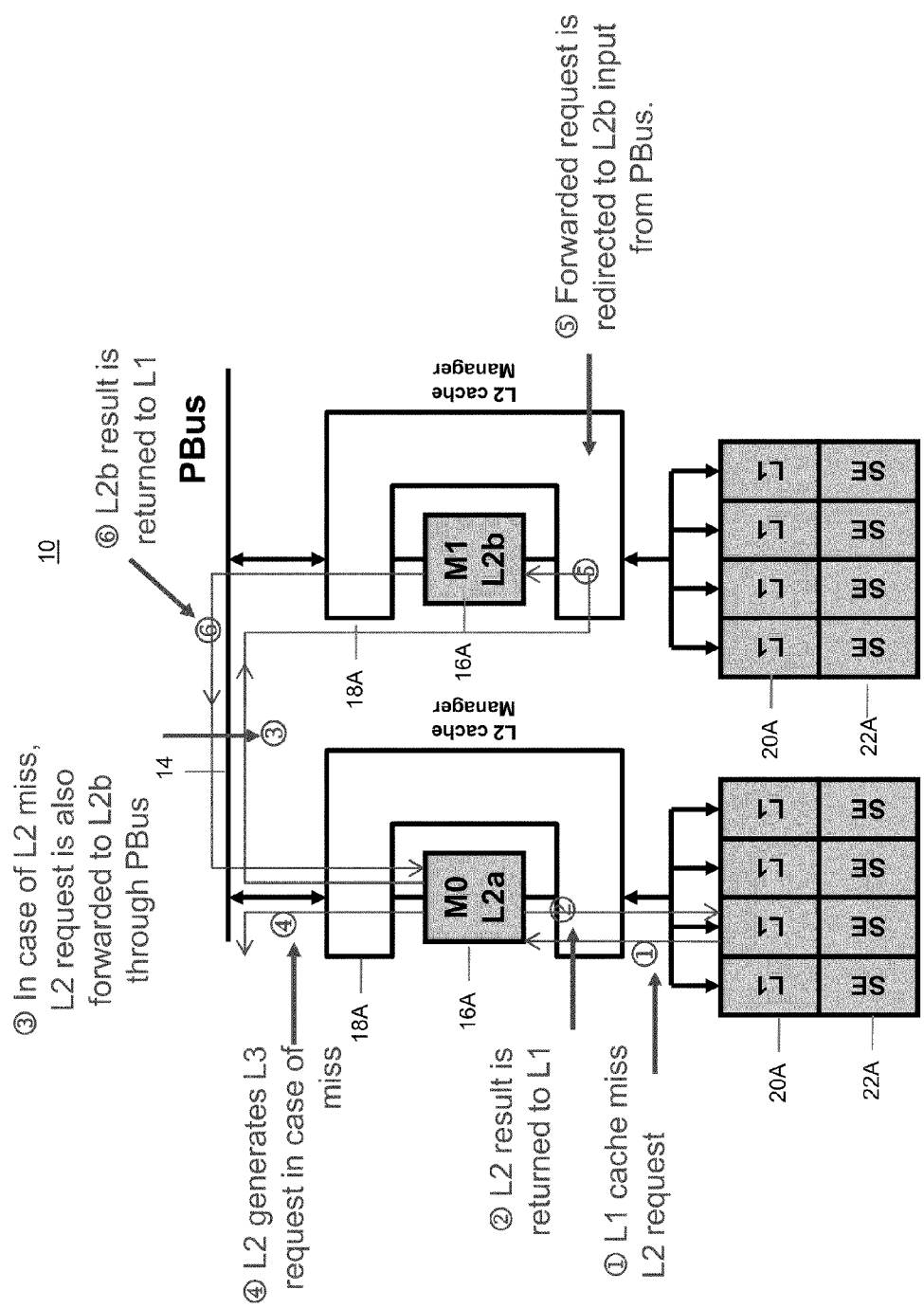
FIGS. 2-3 depicts a progression of events involved with processing requests using the pseudo cache memory system of FIG. 1 according to one example of the present invention.
Figure 3:
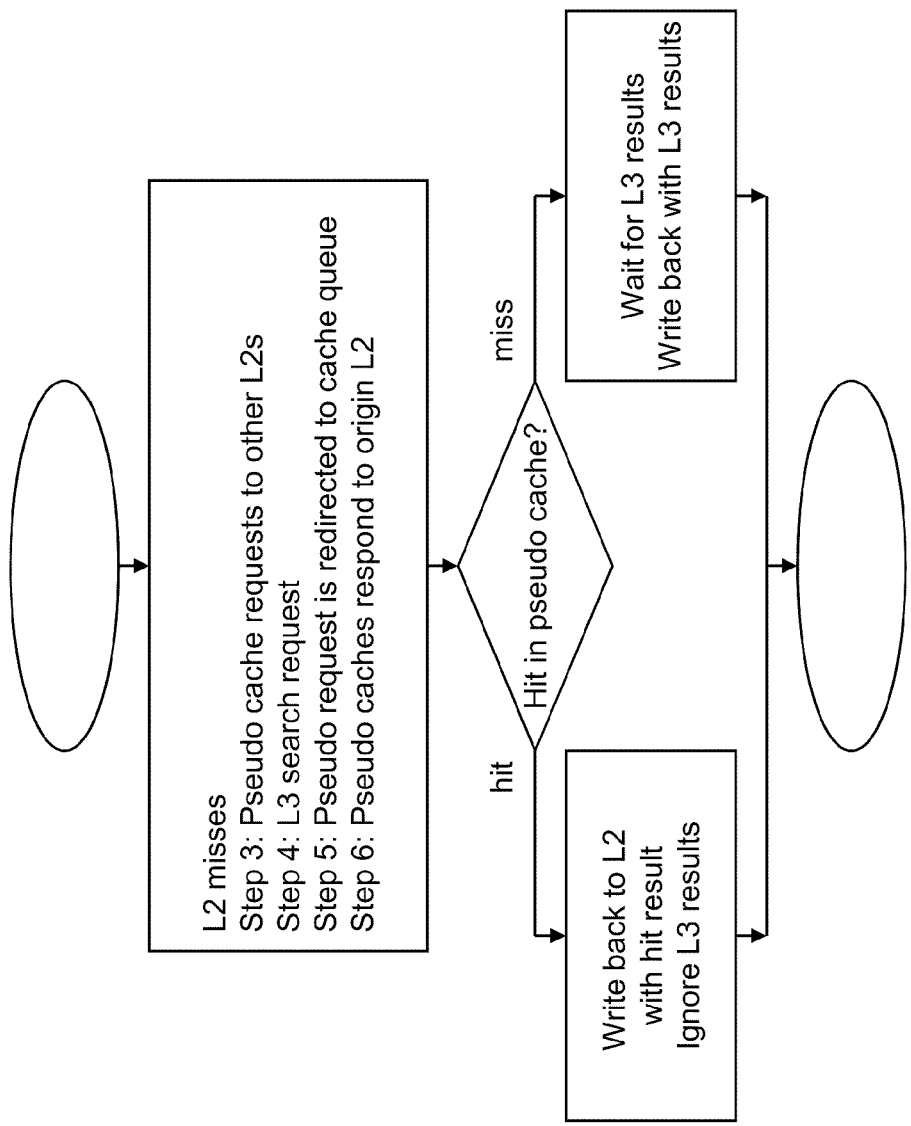

FIGS. 2 and 3 show a progression of events for such an example. In step 1, cache memory unit 16A receives cache request from sub-cache memory unit 20A. In step 2, cache memory unit 16A its results to sub-cache memory unit 20A (hit or miss). In steps 3 and 4, in case of a miss b y cache memory unit 16A, a pseudo cache request is sent to cache memory unit 16N and to an additional request is sent to L3 cache memory unit (not shown). The pseudo cache memory unit request causes cache memory unit 16N to be designated as a pseudo cache memory unit of cache memory unit 16A. In step 5, the pseudo cache request is managed differently from a normal cache request by cache manager 18N. Specifically, the pseudo cache memory request is queued for a search on cache memory unit 16N. In step, (pseudo) cache memory unit 16N returns its results (hit/miss). Since it is functioning as a pseudo cache memory unit, cache memory unit 16N performs no further operations (next level search and write back, etc.) even if it is a miss. In the final step, cache memory unit 16A arranges a pseudo cache result and a L3 result. If there is a hit in the pseudo cache memory unit results, the L3 result is ignored. If there is no hit from the pseudo cache memory unit, cache memory unit 16A waits for L3 results to perform normal cache operations (hit/miss/write back).

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A pseudo memory system, comprising:
    a first memory unit mounted on a bus;
    a first manager coupled to an input and an output of the first memory unit; and
    a second memory unit mounted on the bus, the second memory unit being on a common hierarchical level with the first memory unit and the first cache manager being configured to:
        designate a the memory block of the second memory unit as a pseudo memory unit for the first memory unit,
        receive a request, and send the request simultaneously to a third memory unit located externally on a higher hierarchical level than the common hierarchical level and to the memory block of the second memory unit, and
        enable the second memory unit to function as a next-level higher cache to the first memory unit following a cache memory miss on the common hierarchical level.

2. The pseudo memory system of claim 1, the first memory unit and the second memory unit comprising virtualized cache memory units, and the first manager being a cache manager.

3. The pseudo memory system of claim 1, further comprising a second manager coupled to the second memory unit, the second manager being operable to receive the request from the first cache manager, send the request to the second memory unit, and configure the second memory unit to act as a pseudo memory unit for the first memory unit.

4. The pseudo memory system of claim 3, further comprising:
    a first set of sub-memory units coupled to the first manager; and
    a first set of sub-processing elements coupled to the first set of sub-memory units.

5. The pseudo memory system of claim 4, further comprising:
    a second set of sub-memory units coupled to the second manager; and
    a second set of sub-processing elements coupled to the second set of sub-memory units.

6. The pseudo memory system of claim 1, the bus being coupled to a main controller.

7. The pseudo memory system of claim 1, the first manager being further coupled to the bus.

8. The pseudo memory system of claim 7, the third memory unit also coupled to the bus.

9. A pseudo cache memory system, comprising:
    a first cache memory unit coupled to a bus;
    a first cache manager coupled to an input and an output of the first cache memory unit, and
    a second cache manager coupled to an input and an output of the second cache memory unit; and a second set of sub-cache memory units coupled to the second cache manager,
    wherein the first cache manager is operable to:
        designate a memory block of the second cache memory unit as a pseudo cache memory unit of the first cache memory unit to enable the second memory unit to function as a next-level higher cache to the first memory unit,
        receive a request, and
        simultaneously send the request to the memory block of a second cache memory unit and to a third memory unit located externally on a higher hierarchical level than a common hierarchical level of the first cache memory unit and the second cache memory unit, wherein the request is simultaneously sent following a cache memory miss on the common hierarchical level, wherein the second cache memory unit is coupled to the bus, a first set of sub-cache memory units coupled to the first cache manager.

10. The pseudo cache memory system of claim 9, further comprising a first set of sub-processing elements coupled to the first set of sub-cache memory units.

11. The pseudo cache memory system of claim 9, further comprising a second set of sub-processing elements coupled to the second set of sub-cache memory units.

12. The pseudo cache memory system of claim 9, the bus being coupled to a main controller.

13. The pseudo cache memory system of claim 9, the second cache manager being operable to designate another cache memory unit in the common hierarchy as a pseudo cache memory unit of the second cache memory unit.

14. A pseudo cache memory method, comprising:
    receiving a request on a first cache manager, the first cache manager being coupled to an input and an output of a first memory unit, the first cache memory unit being coupled to a bus;

designating a memory block of a second cache memory unit as a pseudo cache memory unit of the first cache memory unit, the second cache memory unit also being coupled to the bus, the second cache memory unit being in a common hierarchical level as the first cache memory unit; and sending the request simultaneously to the pseudo cache memory unit and a third cache memory unit located externally on a higher hierarchical level than a common hierarchical level of the first cache memory unit and the second cache memory unit, wherein the request is sent simultaneously following a cache memory miss on the common hierarchical level to enable the second memory unit to function as a next-level higher cache to the first memory unit.

15. The pseudo cache memory method of claim 14, the request being received from a first set of sub-memory units coupled to the first cache memory unit.

16. The memory pseudo method of claim 14, further comprising:

receiving the request on second cache manager coupled to the pseudo cache memory unit; and processing the result using the pseudo cache memory unit.

17. The pseudo cache memory method of claim 14, further comprising sending a result of the processing to the first cache memory unit.

18. The pseudo cache memory method of claim 14, the third cache memory unit is coupled to the bus.

* * * * *